United States Patent [19]

Kawazoe

[11] 4,171,893

[45] Oct. 23, 1979

[54] ELECTRICALLY DRIVEN FILM REWIND APPARATUS FOR CAMERA

[75] Inventor: Mitsuo Kawazoe, Hachioji, Japan

[73] Assignee: Olympus Optical Company Ltd., Tokyo, Japan

[21] Appl. No.: 815,171

[22] Filed: Jul. 13, 1977

[30] Foreign Application Priority Data

Aug. 4, 1976 [JP] Japan ............... 51/104187[U]
Aug. 12, 1976 [JP] Japan ............... 51/107974[U]
Aug. 12, 1976 [JP] Japan ............... 51/107975[U]

[51] Int. Cl.² ............... G03B 1/18; G03B 1/40
[52] U.S. Cl. ............... 354/173; 354/214
[58] Field of Search ............... 354/170, 171, 173, 172, 354/214; 352/124; 200/52 R, 61.46; 242/71.6

[56] References Cited

U.S. PATENT DOCUMENTS

| | | | |
|---|---|---|---|
| 3,598,033 | 8/1971 | Sasaki ............... | 354/214 |
| 3,783,762 | 1/1974 | Sugimori ............... | 354/173 |
| 3,953,691 | 4/1976 | Grosseau ............... | 200/61.46 |
| 3,981,022 | 9/1976 | Iwashita et al. ............... | 354/171 |

FOREIGN PATENT DOCUMENTS 4881601  4/1975  Japan .

*Primary Examiner*—L. T. Hix
*Assistant Examiner*—William B. Perkey
*Attorney, Agent, or Firm*—Lerner, David, Littenberg & Samuel

[57] ABSTRACT

An electrically driven film rewind apparatus for a camera comprises a film rewind motor, drive gearing driven by the motor for rotating a film rewind shaft, clutch means in the drive gearing for operatively connecting and disconnecting the film rewind shaft with or from the motor, and clutch control means including means for maintaining the clutch means in its operative position during a film rewind operation in which the clutch means is effective to operatively connect the film rewind shaft with the motor and for automatically causing the clutch means to be disconnected from the film rewind shaft from the motor immediately upon termination of a film rewind operation.

14 Claims, 4 Drawing Figures

ELECTRICALLY DRIVEN FILM REWIND APPARATUS FOR CAMERA

BACKGROUND OF THE INVENTION

The invention relates to an electrically driven film rewind apparatus for camera.

An electrically driven film rewind apparatus for use in a camera is designed to perform an automatic rewind operation of an exposed film under control of a motor drive. A film rewind shaft is operatively connected with the motor only during a film rewind operation through a drive gearing which incorporates a clutch.

An apparatus of this kind must have the provision to permit a manual rewind operation. For this reason, it is desirable that the force required to perform a film rewind operation be minimized in either electrically driven or manual mode. This makes it desirable to use a drive gearing which is as simple in construction as possible.

However, in conventional drive gearings, the film rewind shaft is located a spaced distance from a clutch mechanism, which resulted in a complex drive gearing, thereby requiring an increased force for its operation. In addition, the clutch mechanism has been actuated and deactuated by separate members, which again required an increased force for operation, in addition to resulting in an increased number of parts and a troublesome operation.

SUMMARY OF THE INVENTION

It is an object of the invention to eliminate the problems experienced with the prior art arrangement by the provision of clutch means which cooperates with a film rewind shaft and of clutch control means which automatically maintains the clutch means in its operative position during a film rewind operation and which automatically deactuates the clutch means upon termination of a film rewind operation.

The provision of the clutch control means in accordance with the invention dispenses with the need for a clutch releasing member, thus substantially simplifying the construction of the drive gearing.

DESCRIPTION OF PREFERRED EMBODIMENTS

Figure 1:
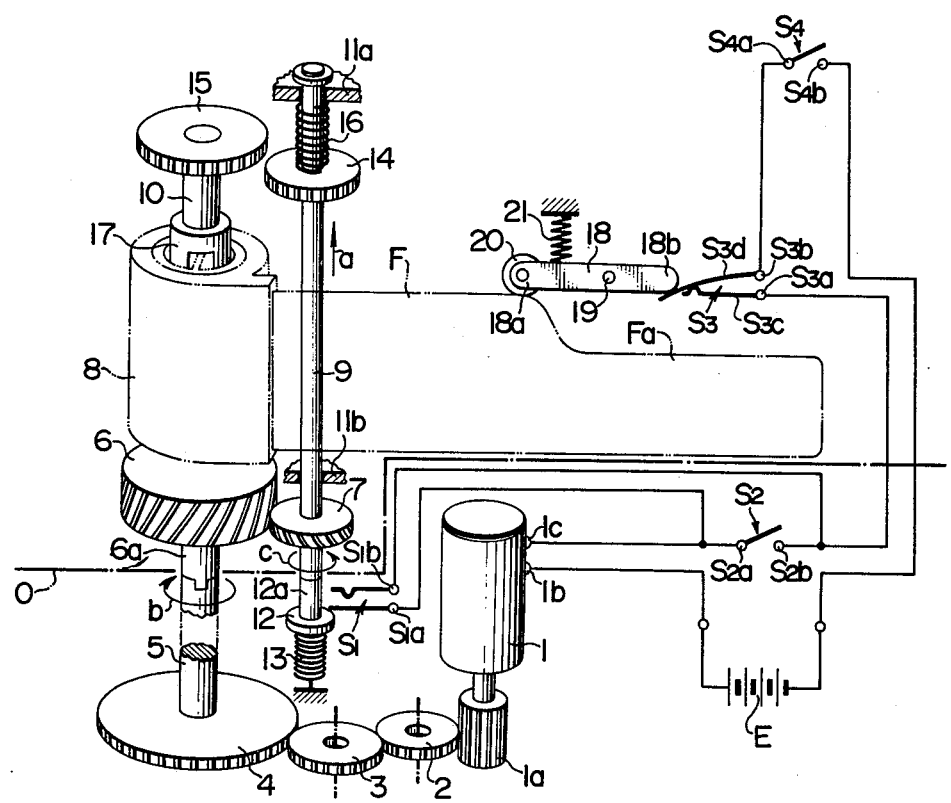
FIGS. 1 to 4 are perspective views of several embodiments of the electrical driven film rewind apparatus for a camera and constructed in accordance with the invention.

Referring to FIG. 1, there is shown part of a camera which is connected with a motor drive. The motor drive is shown in the lower portion of FIG. 1 which is delineated by a phantom line O, and part of a camera is shown above the phantom line. It is to be understood that the motor drive includes a film winding mechanism, not shown, while the camera includes a lens system, a shutter system and other components, all of which are not shown. In FIG. 1, the motor drive includes a motor 1 for rewinding an exposed film F and carrying an output gear 1a which meshes with an intermediate gear 2. The gear 2 is in turn in meshing engagement with another intermediate gear 3, which meshes with a drive gear 4 of a larger diameter.

A helical gear 6 having a substantial tooth width is rotatably mounted in the camera adjacent to a film chamber, and when the motor drive is coupled with the camera, a shaft 5 on which the drive gear 4 is mounted is mechanically coupled with a shaft 6a on which the helical gear 6 is mounted. A helical gear 7 of a reduced diameter, which meshes with the helical 6, is fixedly mounted on a clutch shaft 9 which is disposed adjacent to a cartridge 8 of the film F so as to be slidable in the vertical direction. The shaft 9 comprises a rotatable shaft of a small diameter and has its upper end rotatably supported in a stationary member 11a of the camera while its lower end extends through another stationary member 11b of the camera to a position adjacent to the shaft 5. As shown, the upper end portion of the clutch shaft 9 extends in parallel relationship and adjacent to a film rewind shaft 10 which is located above the cartridge 8.

A switch operating member 12a having a flange 12 is disposed within the motor drive in axial alignment with the clutch shaft 9 and is slidably urged in the upward direction by a spring 13. As will be further mentioned later, the member 12a moves upward as the shaft 9 rises, thus allowing the flange 12 to close a switch S1.

A gear 14 which forms a clutch mechanism together with the gear 7 and the shaft 9 is fixedly mounted on the clutch shaft 9 adjacent to the upper end thereof. A gear 15 is fixedly mounted on the upper end of the film rewind shaft 10 and is adapted for meshing engagement with the gear 14. A compression spring 16 is disposed on the clutch shaft 9 between the stationary member 11a and the gear 14. The film rewind shaft 10 comprises a fork 17 adapted to engage a spool located within the cartridge 8, and a shank secured to the fork 17, the gear 15 being mounted on the shank.

The clutch mechanism operates such that when the clutch shaft 9 moves upward as indicated by an arrow a, the gear 14 moves into meshing engagement with the gear 15 to connect the film rewind shaft 10 with the motor 1 while a downward movement of the clutch shaft disengages the gear 14 from the gear 15, thus interrupting the connection therebetween. The upward movement of the clutch shaft 9 takes place automatically as the helical gears 6, 7 rotate. Specifically, when the helical gear 6 rotates, its meshing helical gear 7 also rotates in following relationship therewith, but since the tooth traces are both skewed, there is produced a vertical component of the force which acts on the gear 7 of a reduced diameter and a reduced tooth width to move it upward. As a consequence, the clutch shaft 9 on which the gear 7 is fixedly mounted moves upward automatically against the resilience of the spring 16. The gear 7 is retained in its upper position, thus maintaining the clutch operative. It will be seen that the helical gears 6, 7 together constitute clutch control means which maintains the clutch operative.

The motor 1 has a pair of power supply terminals 1b and 1c, one of which, 1b, is connected with the positive terminal of a power source E while the other terminal 1c is connected with a movable contact S2a of a start switch and one of the movable contacts, S1a, of the switch S1. The switch S1 has a pair of movable blade contacts which extend into the path of movement of the flange 12, and is normally open. When the flange 12 moves upward, the switch S1 is closed. The other movable contact S1b of the switch S1 is connected with a stationary contact S2b of the start switch S2, to which is connected one terminal S3a of a normally open, automatic stop switch S3 comprising a pair of movable blade contacts S3c, S3d. The swith S3 is adapted to be operated by a detecting lever 18 which is adapted to rock when it detects a leader portion Fa of the film F. The detection lever 18 is pivotally mounted on a pin 19, and rotatably carries a detecting roller 20 on the free end of its one arm 18a. The lever 18 has another arm 18b which extends over the switch S3 so as to operate it. The arm 18a is biased by a spring 21 to urge the detecting roller 20 against the lateral edge of the film F. As is well recognized, the leader portion Fa of the film F has a reduced width. In other words, the film F is slitted along its one lateral edge adjacent to its free end, thereby providing the leader portion Fa. The detecting roller 20 is adapted to detect the leader portion Fa, and when the leader portion Fa is detected, the detecting lever 18 rocks counter-clockwise about the pin 19, thereby opening the switch S3. The other terminal S3b of the switch S3 is connected with movable contact S4a of a malfunction preventing switch S4, the stationary contact S4b of which is connected with the negative terminal of the power source E. The malfunction preventing switch S4 is of the normally-open type and is closed in a well known matter by means of a sprocket unlocking member (not shown for purposes of simplicity), which sprocket unlocking member is operated to initiate film rewinding.

In operation, when an exposed film is wound entirely on a take-up spool (not shown) the rewind of the film into the cartridge 8 is initiated by closing the switch S4 and then closing the start switch S2. At this time, the automatic stop switch S3 remains closed since the detecting roller 20 bears against the edge of the full width film to rock the detecting lever 18 clockwise about the pin 19, thus bringing the arm 18b into abutment against the movable blade contact S3d. When the start switch S2 is closed, a circuit is completed including the positive terminal of the power source E, feed terminal 1b, motor 1, feed terminal 1c, start switch S2, automatic stop switch S3 and switch S4 and returning back to the negative terminal of the power source E. As the motor 1 is energized, the gear train comprising components 1a, 2 and 3 drives the drive gear 4 in the direction indicated by an arrow b. This results in a simultaneous rotation of the helical gear 6, whereby its meshing gear 7 rotates in a direction indicated by an arrow c, accompanying a rotation of the clutch shaft 9 in the same direction. As mentioned above, a vertical component of force acts on the helical gear 7 during its rotation, so that it moves upward while rotating. As a consequence, the clutch shaft 9 also moves upward overcoming the resilience of the spring 16 to bring the gear 14 into meshing engagement with the gear 15, thus actuating the clutch. The resulting rotation of the gear 15 in the direction indicated by the arrow b causes the fork 17 to rotate the spool located within the cartridge 8, thus achieving a rewind operation of the film F. As the clutch shaft 9 moves upward, the flange 12 also moves upwardly, whereby the switch S1 is closed to maintain the energization of the motor 1 after the start switch S2 is released or opened.

When the rewind operation of the film F is terminated and the leader portion Fa passes by the detecting roller 20, the latter detects it by causing a counter-clockwise rotation of the detecting lever 18 about the pin 19. This results in opening the automatic stop switch S3 to interrupt the energization of the motor 1. Thus the motor 1 is deenergized and comes to a stop, and the automatic film rewind operation is completed.

When the motor 1 stops, the drive gear 4 and the helical gear 6 cease to rotate, and hence the helical gear 7 ceases to rotate, so that the upward vertical component of force is removed. As a consequence, the resilience of the spring 16 urges the clutch shaft 9 downward, thus automatically interrupting the connection between the gears 14 and 15. In this manner, with the electrically driven film rewind apparatus of the invention, the rewind operation is fully automatically achieved by merely closing the start switch, without requiring any other mechanical operation or additional human intervention. It is to be noted that while in the embodiment described above, the movement of the clutch shaft has been achieved by utilizing the vertical component of force acting on the helical gear, the clutch shaft can be moved vertically by other means such as one utilizing the centrifugal effect which is produced upon rotation of the drive gear 4.

Figure 2:
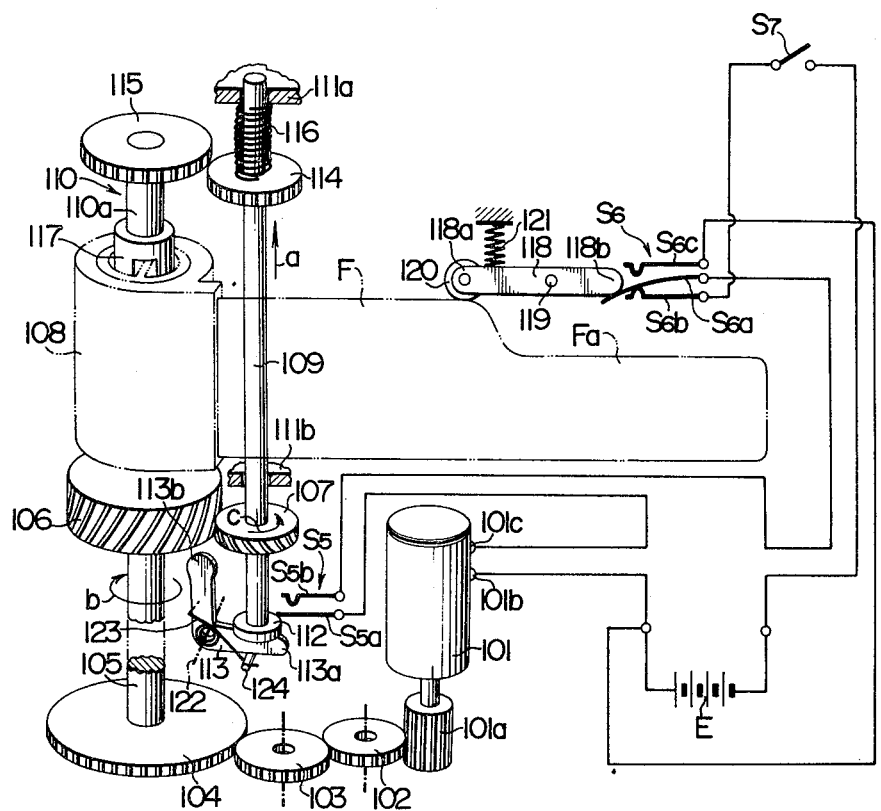

FIG. 2 shows another embodiment of the invention which includes a separate operating member for actuating the clutch. Specifically, there is shown a motor 101 which is utilized for a film rewind operation. The motor 1 has an output gear 101a meshing with a transmission gear 102, which in turn meshes with another transmission gear 103. A gear 104 of a larger diameter 104 is in meshing engagement with the gear 103, and is mounted on one end of a shaft 105. Fixedly mounted on the other end of the shaft 105 is a drive gear 106 formed by a helical gear having an increased tooth width and meshing with a driven gear 107 which is again formed by a helical gear but of a reduced diameter. The gear 107 is fixedly mounted on a drive shaft 109 which is disposed adjacent to a cartridge 108 for the film F in a manner to be slidable in the vertical direction. The drive shaft 109 serves as the transmission means coupling the rotating effect to a film rewind shaft 110 or the connection or disconnection of the clutch. The shaft 109 comprises a rotatable shaft of a reduced diameter and having its upper end rotatably mounted in a stationary member 111a of a camera and located adjacent to the film rewind shaft 110 which is positioned above the cartridge 108. The lower end of the drive shaft 109 extends through another stationary member 111b of the camera and is located adjacent to the shaft 105. A flange 112 for operating a power supply switch S5 is fixedly mounted on the lower end of the drive shaft 109. The flange 112 is positioned so that it rests on one arm 113a of an operating member 113, which functions to move the drive shaft 109 upward to actuate the clutch.

The operating member 113 comprises a lever in the form of a bell crank and having its fulcrum mounted on a pin 122. A torsion spring 123 is disposed on the pin 122 and urges the lever to rock clockwise about the pin. However, the resulting rocking movement of the lever is normally prevented by abutment of its one arm 113a against a stop pin 124. Another arm 113b of the operating member 113 can be operated to rock counter-clockwise about the pin 122 to raise the drive shaft 109 upward.

A gear 114 which forms a clutch mechanism together with gear 107 and shaft 109 is fixedly mounted on the drive shaft 109 toward its upper end. The film rewind shaft 110 comprises a fork 117 adapted to engage a spool located within the cartridge 108, and a shank 110a which is secured to the fork 117. A gear 115 is mounted on the shank 110a and is adapted to mesh with the gear 114. A compression spring 116 is disposed on the drive shaft between the stationary member 111a and the gear 114.

The clutch mechanism operates such that when the drive shaft 109 is moved upward in a direction indicated by an arrow a, the resulting meshing engagement between the gears 114 and 115 is effective to connect the film rewind shaft 110 with the motor 101, while when the drive shaft 9 moves down or in the opposite direction from that indicated by the arrow a, the gear 114 is disengaged from the gear 115 to disconnect the drive transmission relationship therebetween.

The motor 101 has a pair of power supply terminals 101b and 101c, the terminal 101b being connected with the positive terminal of a power source E and the other terminal 101c being connected with a movable contact S5a of a power switch S5. The switch S5 is a normally open switch having a pair of movable blade contacts S5a, S5b extending into the path of movement of the flange 112. When the flange 112 moves upward, the switch S5 is closed. The other movable contact S5b of the switch S5 is connected with a movable contact S6a of an automatic stop switch S6. The switch S6 comprises a pair of stationary contacts S6b, S6c between which the movable contact S6a can be shifted under the control of a detecting lever 118 which is adapted to rock upon detection of a leader portion Fa of the film F.

The detecting lever 118 is pivotally mounted on a pin 119 and rotatably carries a detecting roller 120 on the free end of its one arm 118a. The lever 118 includes another arm 118b which extends over the movable contact S6a of the switch S6 for the purpose of operating it. The arm 118a is biased by a spring 121 to urge the detecting roller 120 against the lateral edge of the film F. Since the leader portion Fa of the film is slitted along its one lateral edge so as to have a reduced width, when the leader portion Fa is detected by the detecting roller 120, the latter member causes the detecting lever 118 to rock counter-clockwise about the pin 119, thus operating the switch S6 with its arm 118b. The stationary contact S6b of the switch S6 is connected through a malfunction preventing switch S7 with the negative terminal of the power source E while the other stationary contact S6c is connected with the positive terminal of the power source E. When the film rewind operation is terminated and the leader portion Fa detected to change the movable contact S6a of the switch S6, the electrical path completed between the contacts S6a and S6c forms a shortcircuit path across the motor 101, thus applying a braking action thereof to snubber it.

In operation, when it is desired to rewind an exposed film which is now disposed on a take-up spool, back into the cartridge 108, the malfunction preventing switch S7 is initially closed and then the operating member 113 rocked counter-clockwise about the pin 122. Since the detecting roller 120 bears against the edge of the full width film, the detecting lever 118 now assumes a clockwise rocked position against the bias of spring 121, so that its arm 118b brings the movable contact S6a into contact with the stationary contact S6b of the automatic stop switch S6. When the operating member 113 is rocked counter-clockwise, its arm 113a drives the flange 112 upward, whereby the drive shaft 109 moves upward against the resilience of the spring 116, in a direction indicated by an arrow a. This brings the gear 114 into meshing engagement with the gear 115, thereby actuating the clutch. In addition, the upward movement of the flange 112 closes the power supply switch S5, whereby a circuit for the energization of the motor 101 is completed including the source E, terminal 101b, motor 101, terminal 101c, power switch S5, automatic stop switch S6 and malfunction preventing switch S7 and back to the source E. The gear train 101a, 102, 103 rotates the gear 104 in the direction of the arrow b, whereby the drive gear 106 is rotated simultaneously, accompanying a concurrent rotation of the follower gear 107 and the drive shaft 109 in the direction indicated by an arrow c. This results in a rotation of the gear 114 in the direction of the arrow c, and the gear 115 then rotates in the direction of the arrow b, thus causing the fork 117 to rotate the spool within the cartridge 108 to rewind film F into the cartridge. Since the follower gear 107 comprises a helical gear, its rotation produces a vertical component of force thereon acting to move it upward, thus maintaining the drive shaft 109 in its upper position. When the operating member 113 is returned to move the arm 113a away from the flange 112, the drive shaft 109, follower gear 107 and gear 114 remain in their upper position.

In this manner, the film F is automatically rewound from the take-up spool into the cartridge 108. When the film rewind operation is terminated, the reduced width of the leader portion Fa is detected by the detecting roller 120, which causes the detecting lever 118 to rock counter-clockwise about the pin 119. This results in changing the movable contact S6a of the switch S6 from the stationary contact S6b to the other stationary contact S6c. Thereupon, the motor 101 is deenergized and snubbered, completing a film rewind operation. When the motor 101 stops, the drive shaft 109 no longer rotates, whereby the aforementioned upward vertical component of force acting on the follower gear 107 is removed, allowing the drive shaft 109 to be driven downward by the spring 116. Thus, the connection between the gears 114 and 115 is interrupted, and the power switch S5 is opened.

Figure 3:
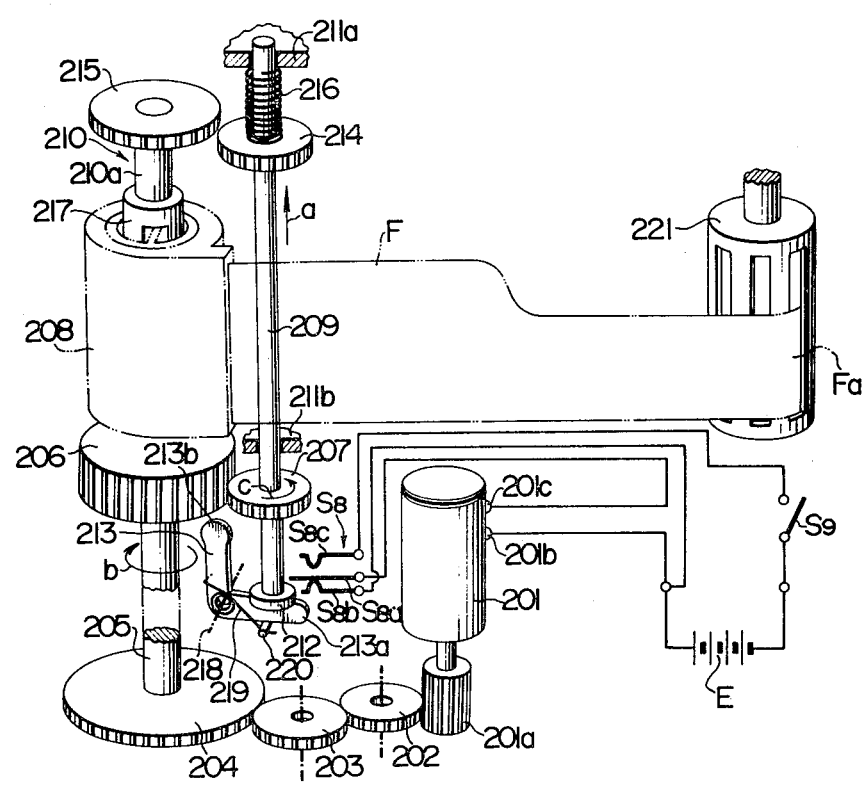

FIG. 3 shows a further embodiment of the invention in which the clutch control means is formed by a pair of intermeshing spur gears. In this Figure, there is shown a motor 201 for rewinding film F. The motor has an output gear 201a which is in meshing engagement with a transmission gear train including intermediate gears 202, 203 and a large diameter gear 204. The gear 204 is mounted on the lower end of a shaft 205, on the upper end of which is fixedly mounted a drive gear 206 formed by a helical gear. The drive gear 206 meshes with a driven gear 207 of a reduced diameter which comprises a helical gear. The gear 207 is fixedly mounted on a drive shaft 209 disposed adjacent to a cartridge 208 for the film F so as to be slidable in a vertical direction. The drive shaft 209 serves to transmit the rotating effort to a film rewind shaft 210 for or the actuation and deactuation of a clutch. The shaft 209 comprises a rotatable shaft of a reduced diameter having its upper end rotatably supported in stationary member 211a of the camera and located adjacent to the film rewind shaft 210, which is in turn positioned above the cartridge 208. The lower end of the drive shaft 209 extends through another stationary member 211b of the camera and is disposed adjacent to the shaft 205. A flange 212 for operating a power switch S8 is fixedly mounted on the lower end of the drive shaft 209. The flange 212 is positioned so that it rests on one arm 213a of an operating member 213 which is utilized for actuating the clutch.

The operating member 213 comprises an L-shaped lever having its pivotal axis mounted on a pin 218. A torsion spring 219 is disposed on the pin 218 to urge the member 213 to rotate clockwise about the pin. However, the resulting rocking movement of the operating member 213 is normally prevented by the abutment of its arm 213a against a stop pin 220. The operating member 213 has another arm 213b, which can be rocked counter-clockwise about the pin 218 to drive the drive shaft 209 upward.

A spur gear 214 which forms a clutch mechanism together with gear 207 and shaft 209 is fixedly mounted on the drive shaft 209 toward its upper end. The gear 214 is adapted to mesh with a spur gear 215 fixedly mounted on the shank 210a of the film rewind shaft 210, and a compression spring 216 is disposed on the drive shaft between the stationary member 211a and the gear 214. The film rewind shaft 210 comprises a fork 217 adapted to engage a spool received within the cartridge 208 and the shank 210a secured to the fork 217.

The clutch mechanism operates such that when the drive shaft 209 moves upward in a direction indicated by an arrow a, the gear 214 moves into meshing engagement with the gear 215 to connect the film rewind shaft 210 with the motor 201 while when the drive shaft 209 moves in the opposite direction from the arrow a, the gear 214 is disengaged from the gear 215 to interrupt the connection therebetween.

The motor 201 has a pair of power supply terminals 201b, 201c, the former being connected with the positive terminal of a power source E and the latter with a movable contact S8a of the power switch S8. The switch S8 includes a pair of stationary blade contacts S8b, S8c located on the opposite sides of the movable contact S8a and between which the movable contact S8a can be shifted. Normally, the movable blade contact S8a engages the stationary contact S8b. The stationary contact S8b is connected with the motor terminal 201b to short-circuit the motor when it is to be stopped, thus applying a braking action thereon to snubber it. The free end of the movable contact S8a extends into the path of movement of the flange 212 so that when the flange 212 moves upward, it moves the movable contact away from the stationary contact S8b and into engagement with the other stationary contact S8c, thus changing the switch. The stationary contact S8c is connected through a main switch S9 with the negative terminal of the power source E.

In operation, in order to rewind an exposed film F which is now disposed on a take-up spool 221 back into the cartridge 208, the operating member 213 is initially rocked counter-clockwise about the pin 218 and then the main switch S9 closed. A counter-clockwise rocking motion of the operating member 213 causes its arm 213a to raise the flange 212, whereby the drive shaft 209 is driven upward in the direction of the arrow a against the resilience of the spring 216. This brings the gear 214 into meshing engagement with the gear 215, thus actuating the clutch. The upward movement of the flange 212 also moves the movable blade contact S8a of the power switch S8 upward, whereby the switch is changed to another position in which the movable contact S8a engages the other stationary contact S8c. Thus, a circuit for energization of the motor 201 is completed including power source E, terminal 201b, motor 201, terminal 201c, movable contact S8a, stationary contact S8c and main switch S9 back to the negative terminal of the power source E. When the motor 201 is energized, the gear train 201a, 202, 203 causes the gear 204 to rotate in the direction of the arrow b, thereby simultaneously rotating the drive gear 206. Hence, the follower gear 207 which meshes therewith rotates in the direction of the arrow c, causing the drive shaft 209 also to rotate. The gear 214 fixedly mounted on the drive shaft 209 then rotates in the same direction, so that the gear 215 rotates in the direction of the arrow b, causing the fork 217 to rotate the spool in the cartridge 208, thus rewinding the film F from the take-up spool 221 back into the cartridge 208.

When the film rewind operation is initiated in this manner, the running film F presents a load on the drive shaft 209 which causes a frictional engagement between the gears 214 and 215, thus maintaining the drive shaft 209 in its upper position. As a consequence, the operating member 213 may be released to free the arm 213a from the flange 212 without causing a downward movement of the drive shaft 209, follower gear 207 and gear 214. Thus, in the present embodiment, the clutch control means which maintains the clutch in its actuated position is formed by the combination of the drive gear 214 and the driven gear 215.

During an automatic film rewind operation to rewind the film from the spool 221 into the cartridge 208, when a leader portion Fa of the film F which has been slipped into an opening in the spool 221 is disengaged therefrom, the drive shaft 209 is unloaded and becomes free to move down to its original position under the resilience of the spring 216. The downward movement of the drive shaft 209 is effective to disengage the gear 214 from the gear 215, and to shift the movable contact S8a from the stationary contact S8c to the other stationary contact S8b of the power switch S8. When the switch S8 is changed in this manner, the energization circuit of the motor 201 is interrupted, and the motor comes to a stop. It will be appreciated that the terminal pair of the motor 201 is short-circuited by the path including the movable contact S8a and the stationary contact S8b, whereby a braking action is applied to the motor to snubber it. The film rewind operation is now automatically completed.

Figure 4:
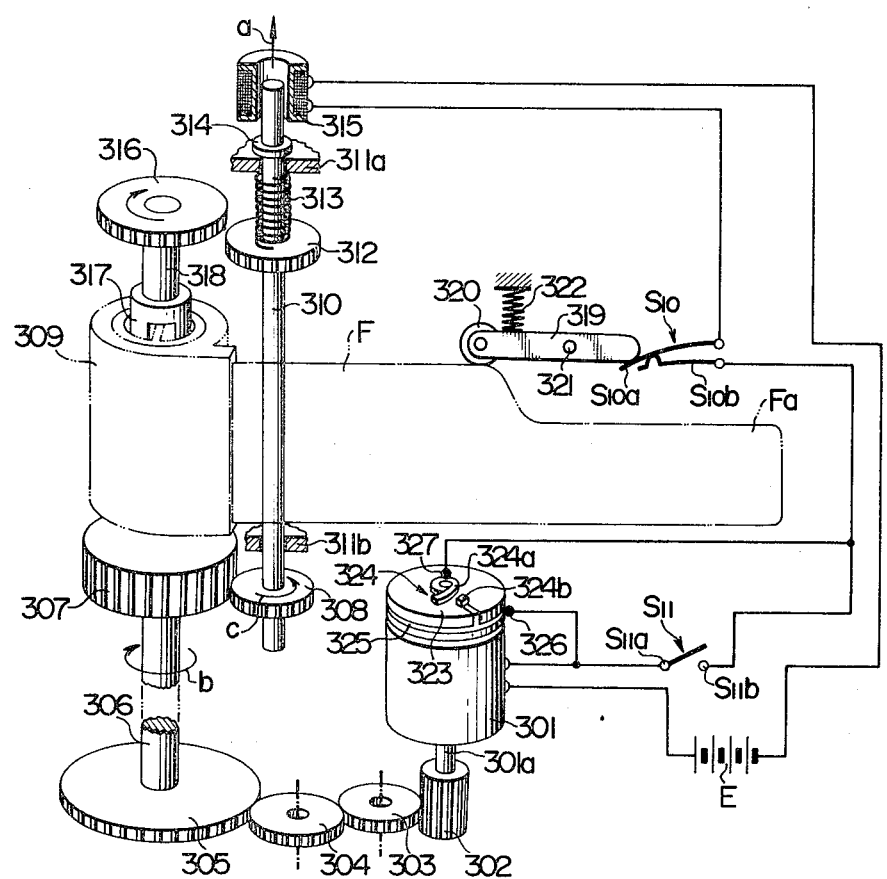

FIG. 4 shows yet another embodiment of the invention in which the clutch control means comprises an electromagnet. Referring to FIG. 4, there is shown a film rewind motor 301 having an output shaft 301a, and a gear 302 is fixedly mounted on the lower end of the shaft. The gear 302 is operatively connected with a drive transmission gear 305 of a larger diameter through intermediate gears 303, 304. The gear 305 is fixedly mounted on the lower end of a shaft 306, on the upper end of which is fixedly mounted a drive gear 307 formed by a spur gear having an increased tooth width. The gear 307 meshes with a driven gear 308 which also comprises a spur gear. The gear 308 is fixedly mounted on a drive shaft 310 adjacent to its lower end, which shaft is disposed to extend in the vertical direction adjacent to a cartridge 309 for the film F. At vertically spaced points, the shaft 310 extends through a pair of stationary plates 311a, 311b of the camera so as to be rotatably supported thereby. A clutch actuating gear 312 which also comprises a spur gear is fixedly mounted on the upper portion of the shaft 310, and a coiled compression spring 313 is disposed on the shaft 310 between the gear 312 and upper plate 311a, thereby urging the shaft 310 downward. A portion of the shaft 310 extends above the stationary plate 311a and fixedly carries a flange 314 which limits the downward movement of the shaft 310. Associated with this portion of the shaft 310 is an electromagnet 315, which when energized, attracts the shaft 310 against the resilience of the coiled spring 313, causing its movement in a direction indicated by an arrow a. In this manner, the portion of the shaft 310 serves as an armature. When the shaft 310 is attracted upward in this manner, it carries the gear 308 integrally therewith while maintaining it in meshing engagement with the gear 307, and also carries the gear 312 in the upward direction. As the gear 312 moves upward, it meshes with a film rewind gear 316, which is secured to the upper end of a rotatable film rewind shaft 318 carrying a forked lower end 317. The forked end 317 is adapted to engage a spool located within the cartridge 309 for driving it. There is provided a film detecting lever 319 which rotatably carries on its one end a film detecting roller 320, which bears against the upper lateral edge of the film F. The lever 319 is pivotally mounted on a pin 321, and is biased by a coiled compression spring 322 extending between its one arm and a stationary point, in a direction to urge the roller 320 against the film edge. The other end of the lever 319 is disposed to urge a movable contact S10a into engagement with a stationary contact S10b of a switch S10 to thereby close it when the roller 320 detects the full width of the film F. Mounted on the upper end of a motor shaft 301 is a rotor 323 on which is mounted a centrifugal switch 324. The switch 324 comprises a movable contact 324a which is adapted to move radially outward under the centrifugal force as the rotor 323 rotates, and a stationary contact 324b which can be engaged by the movable contact 324a. The stationary contact 324b is electrically connected with a conductive slip ring 325 which is disposed on the peripheral surface of the rotor 323 and which is in sliding engagement with a brush 326 connected with one terminal S11a of a main switch S11. A negative terminal of the motor 301 is connected with the terminal S11a or movable contact of the main switch S11 while its positive terminal is connected with the positive terminal of a power source E. The negative terminal of the source E is connected with one terminal of the electromagnet coil 315 which has its other terminal connected with the movable contact S10a of the switch S10, which functions to detect the presence or absence of the film. The stationary contact S10b of the switch S10 is connected with a brush 327 engaging the movable contact 324a of the centrifugal switch 324 and also to the stationary contact S11b of the main switch S11.

When it is desired to rewind the film F back into the cartridge 309 subsequent to the completion of the exposure of the film, the main switch S11 is closed. Thereupon the motor 301 is energized, and the rotor 323 is set in rotation, whereby the centrifugal switch 324 is closed. Since the switch S10 is closed at this time as a result of the presence of the full width of film F, the coil 315 is energized to attract the shaft 310 upward, bringing the gear 312 into meshing engagement with the film rewind gear 316. Then, the rotation of the motor 301 is transmitted through the gear train 302, 303, 304, 305, 307, 308, 312 and 316 to the film rewind shaft 318, thus driving the spool within the cartridge 309 to rewind the film F. If the main switch S11 is opened by this time, the coil 315 remains energized through a path including power source E, motor 301, centrifugal switch 324, switch S10, coil 315 and back to the source E. In this manner, the clutch mechanism which is formed by the gears 307, 308, shaft 310 and gears 312, 316 is maintained in operative condition in which it connects the film rewind shaft 318 with the motor 301.

As the film rewind operation proceeds to a point where the leader portion Fa passes by the film detecting roller 320, the reduced width of the leader film portion causes the lever 319 to be rocked counter-clockwise under the resilience of the coiled spring 322. Thereupon, the movable contact S10a of the switch S10 is freed from the lever 319, opening the switch S10. The opening of the switch S10 is effective to interrupt the closed path which previously maintained the electromagnet 315 and the motor 301 energized. Thus the motor 301 ceases to rotate, thereby opening the centrifugal switch 324. Also the electromagnet 315 is deenergized. Now the shaft 310 is urged downward by the coiled spring 313, so that the clutch mechanism is deactuated, interrupting the operative connection between the film rewind shaft 318 and the motor 301. In this embodiment, it will be understood that the clutch is automatically actuated to connect the film rewind shaft with the motor, maintained in its operative condition during a film rewind operation, and is automatically deactuated upon completion of a film rewind operation.

What is claimed is:

1. An electrically driven film rewind apparatus for a camera including a film rewind motor, drive gearing driven by the output of the motor when the motor is energized for rotating a film rewind shaft, and clutch means assembled into the drive gearing and responsive to operation of the drive gearing for selectively connecting the film rewind shaft with the motor, characterized by the provision of clutch control means including resilient bias means for normally biasing the clutch means in a first direction out of engagement with the film rewind shaft and means responsive to rotation of the drive gearing for moving said clutch means in a second direction opposite said first direction to overcome the force of the resilient biasing means for establishing an operative connection between the film rewind shaft and the motor through the clutch means and drive gearing during a film rewind operation and for automatically placing the clutch means under control of the charged resilient bias means which moves the clutch means in said first direction out of engagement with the film rewind shaft in response to termination of a film rewind operation.

2. An electrically driven film rewind apparatus according to claim 1 in which the clutch control means includes a drive gear and a driven gear each having a helical gear configuration, the arrangement being such that an axial component of force is applied to the driven gear during the rotation of the drive gear for urging the clutch means into the engaged condition.

3. An electrically driven film rewind apparatus according to claim 2 in which the clutch means is moved to its engaged condition by applying an axial force to the driven gear to move the driven gear against the force of said bias means, and means normally maintaining said motor deenergized for energizing said motor responsive to the clutch means being moved to said engaged position to thereby maintain the clutch means in the engaged position during energization of said motor.

4. An electrically driven film rewind apparatus according to claim 1 in which the clutch control means includes a drive gear and a driven gear, comprising a pair of gears, the clutch means being maintained in the engaged condition as a result of the driving engagement between the gears when driven under a load in the form of the film being rewound.

5. An electrically driven film rewind apparatus according to claim 1 in which the clutch means includes a clutch shaft located a predetermined distance from a film rewind shaft which drives a film rewind spool, a drive gear being mounted on the clutch shaft for directly driving a driven gear mounted on the film rewind shaft.

6. An electrically driven film rewind apparatus according to claim 1 in which the energization of the motor is controlled by a switch which is turned on and off in response to the respective actuation and deactuation of the clutch means.

7. An electrically driven film rewind apparatus according to claim 6 in which the switch responsive to the clutch means is effective to complete an electrical circuit between the motor and a supply of electrical energy when the clutch means is in its operative condition and to close to an electrical braking circuit for abruptly braking the motor when the clutch means is deactuated.

8. An electrically driven film rewind apparatus according to claim 6 in which energization of the motor is also controlled by a switch which is responsive to the absence of film to deenergize the motor.

9. The apparatus according to claim 1 wherein said clutch control means comprises a first helical gear driven by said drive gearing; a second helical gear engaging and driven by said first helical gear;
   said second helical gear being mounted upon an axially moveable shaft;
   said clutch means including means for coupling the rotation of said axially moveable shaft to said film rewind shaft;
   said biasing means normally urging said axially moveable shaft in a first direction;
   said second helical gear being moveable in the direction opposite said biasing means when said first helical gear is rotated by said drive gearing.

10. The apparatus according to claim 7 wherein the relative thicknesses of said first and second helical gears are adapted to maintain meshing engagement therebetween while enabling the axial movement of said second helical gear.

11. The apparatus according to claim 10 wherein the first helical gear has a thickness greater than the second helical gear.

12. An electrically driven film rewind apparatus for a camera including a film rewind motor, drive gearing driven by the output of said motor when said motor is energized for rotating a film rewind shaft, and clutch means assembled into the drive gearing and cooperating with the drive gearing for selectively connecting the film rewind shaft with the motor, characterized by the provision of resilient bias means for normally biasing said clutch means in a first direction out of engagement with the film rewind shaft and means responsive to the energization of said motor which initiates rotation of the drive gearing for moving said clutch means in a second direction opposite said first direction to overcome the force of the biasing means for establishing an operative connection between the film rewind shaft and said motor through the clutch means and the drive gearing during a film rewind operation and for automatically releasing the clutch means to place the clutch means under control of said bias means to move the clutch means out of engagement with the film rewind shaft in response to termination of a film rewind operation, said clutch means including a pair of normally disengaged gears, said means for moving said clutch means comprising an electromagnet having an armature; a shaft rotatably supporting one of said normally disengaged gears, said armature being adapted to move said shaft in order to move the normally disengaged gears into engagement when the electromagnet is energized.

13. An electrically driven film rewind apparatus according to claim 12 in which energization of the electromagnet is controlled by a centrifugal switch which enables the energization of the electromagnet to be responsive to a rotation of the motor.

14. An electrically driven film rewind apparatus for a camera including a film rewind motor, drive gearing driven by the output of said motor when said motor is energized for rotating a film rewind shaft, and clutch means assembled into the drive gearing and cooperating with the drive gearing for selectively connecting a film rewind shaft with said motor, characterized by the provision of clutch control means including resilient bias means normally biasing the clutch means out of engagement with the film rewind shaft and means responsive to energization of the film rewind motor for moving said clutch means against the force of the biasing means for establishing an operative connection between the film rewind shaft and said motor through the clutch means and drive gearing during a film rewind operation and for releasing the clutch means to automatically place the clutch means under control of said bias means to move the clutch means out of engagement with the film rewind shaft in response to termination of a film rewind operation, said drive gear means further comprising first and second spur gears; said first spur gear being driven by said motor; said second spur gear meshing with said first spur gear;
   an axially movable shaft for rotatably mounting said second spur gear;
   said means responsive to energization of said film rewind motor further including electromagnet means being selectively energizable to attract said axial movable shaft and urge said shaft against the force of said bias means to engage said clutch means for coupling rotation of said axially movable shaft to said film rewind shaft;
   the relative thicknesses of said first and second spur gears being sufficient to assure their continued meshing and engagement while enabling said second spur gear to move axially relative to said first spur gear.

* * * * *